US012516934B2

(12) United States Patent
Yamada et al.

(10) Patent No.: US 12,516,934 B2
(45) Date of Patent: Jan. 6, 2026

(54) PHYSICAL QUANTITY SENSOR AND ELECTRONIC DEVICE

(71) Applicant: SEIKO EPSON CORPORATION, Tokyo (JP)

(72) Inventors: Hideyuki Yamada, Minowa (JP); Hideo Haneda, Shiojiri (JP); Shinichi Wakabayashi, Suwa (JP); Tatsuya Takahashi, Azumino (JP)

(73) Assignee: SEIKO EPSON CORPORATION (JP)

( * ) Notice: Subject to any disclaimer, the term of this patent is extended or adjusted under 35 U.S.C. 154(b) by 297 days.

(21) Appl. No.: 18/340,055

(22) Filed: Jun. 23, 2023

(65) Prior Publication Data

US 2023/0417549 A1 Dec. 28, 2023

(30) Foreign Application Priority Data

Jun. 24, 2022 (JP) ................................. 2022-101663

(51) Int. Cl.
*G01C 19/5776* (2012.01)
(52) U.S. Cl.
CPC ................................ *G01C 19/5776* (2013.01)
(58) Field of Classification Search
CPC ................................................ G01C 19/5776
See application file for complete search history.

(56) References Cited

U.S. PATENT DOCUMENTS

| 5,656,779 | A  | * | 8/1997  | Bronowicki | G01M 17/0078<br>73/703 |
| 6,959,484 | B1 | * | 11/2005 | Spangler   | G05D 19/02<br>29/721 |
| 2006/0119026 | A1 | * | 6/2006  | Ryaboy     | B60N 2/54<br>267/140.15 |
| 2007/0241711 | A1 | * | 10/2007 | Finamore   | G11B 5/596<br>318/632 |
| 2011/0252887 | A1 | * | 10/2011 | Cardarelli | F16F 15/03<br>73/514.32 |
| 2011/0303011 | A1 | * | 12/2011 | Fu         | G01N 29/28<br>73/579 |
| 2012/0277917 | A1 | * | 11/2012 | Ryaboy     | F16F 15/02<br>73/580 |

(Continued)

FOREIGN PATENT DOCUMENTS

JP 2019-082454 A 5/2019

*Primary Examiner* — David J Bolduc
(74) *Attorney, Agent, or Firm* — Harness, Dickey & Pierce, P.L.C.

(57) ABSTRACT

Provided is a physical quantity sensor attached to an electronic device provided with an actuator. The physical quantity sensor includes: a sensor element configured to output a detection signal corresponding to a physical quantity; and a circuit device configured to output an actuator drive signal for driving the actuator based on the detection signal. The circuit device has a resonance characteristic measurement mode of outputting the actuator drive signal for measuring a resonance characteristic of the electronic device by vibrating the electronic device, and a vibration-damping mode of outputting the actuator drive signal for reducing a vibration of the electronic device based on the resonance characteristic measured in the resonance characteristic measurement mode.

7 Claims, 5 Drawing Sheets

(56) References Cited

U.S. PATENT DOCUMENTS

| | | | |
|---|---|---|---|
| 2014/0000366 A1* | 1/2014 | Blomqvist | G01C 19/5776 73/504.12 |
| 2014/0121844 A1* | 5/2014 | Ryaboy | F16F 15/002 73/580 |
| 2015/0192415 A1* | 7/2015 | Ge | G01C 19/5776 73/504.13 |
| 2017/0082532 A1* | 3/2017 | Ryaboy | G05B 19/042 |
| 2019/0132515 A1 | 5/2019 | Haneda et al. | |
| 2019/0257654 A1* | 8/2019 | Yan | G01C 19/5776 |
| 2020/0217386 A1* | 7/2020 | Kordunsky | G05B 19/042 |
| 2021/0285768 A1* | 9/2021 | Kuisma | G01C 19/02 |

* cited by examiner

PHYSICAL QUANTITY SENSOR AND ELECTRONIC DEVICE

The present application is based on, and claims priority from JP Application Serial Number 2022-101663, filed Jun. 24, 2022, the disclosure of which is hereby incorporated by reference herein in its entirety.

BACKGROUND

1. Technical Field

The present disclosure relates to a physical quantity sensor and an electronic device.

2. Related Art

In the related art, a technique has been known in which an actuator is driven based on a detection signal detected by a physical quantity sensor such as a gyro sensor to damp vibration of an electronic device or the like. For example, JP-A-2019-82454 discloses a gyro sensor device that incorporates a circuit and that improves responsiveness of control of an actuator. The circuit generates an actuator drive signal.

A resonance characteristic of an electronic device may vary depending on a size, a material, and the like of the electronic device. When an installation environment of the electronic device changes, the resonance characteristic may vary. In the related art, it is difficult to damp a vibration according to a change in the resonance characteristic of the electronic device.

SUMMARY

According to an aspect of the present disclosure, there is provided a physical quantity sensor attached to an electronic device provided with an actuator. The physical quantity sensor includes: a sensor element configured to output a detection signal corresponding to a physical quantity; and a circuit device configured to output an actuator drive signal for driving the actuator based on the detection signal. The circuit device has a resonance characteristic measurement mode of outputting the actuator drive signal for measuring a resonance characteristic of the electronic device by vibrating the electronic device, and a vibration-damping mode of outputting the actuator drive signal for reducing a vibration of the electronic device based on the resonance characteristic measured in the resonance characteristic measurement mode.

According to another aspect of the present disclosure, there is provided an electronic device including: an actuator; and a physical quantity sensor including a sensor element attached to the actuator and configured to output a detection signal corresponding to a physical quantity, and a circuit device configured to output an actuator drive signal for driving the actuator based on the detection signal. The circuit device has a resonance characteristic measurement mode of outputting the actuator drive signal for measuring a resonance characteristic of the electronic device by vibrating the electronic device, and a vibration-damping mode of outputting the actuator drive signal for reducing a vibration of the electronic device based on the resonance characteristic measured in the resonance characteristic measurement mode.

DESCRIPTION OF EXEMPLARY EMBODIMENTS

Hereinafter, embodiments of the present disclosure will be described in detail with reference to drawings.

First Embodiment

Figure 1:
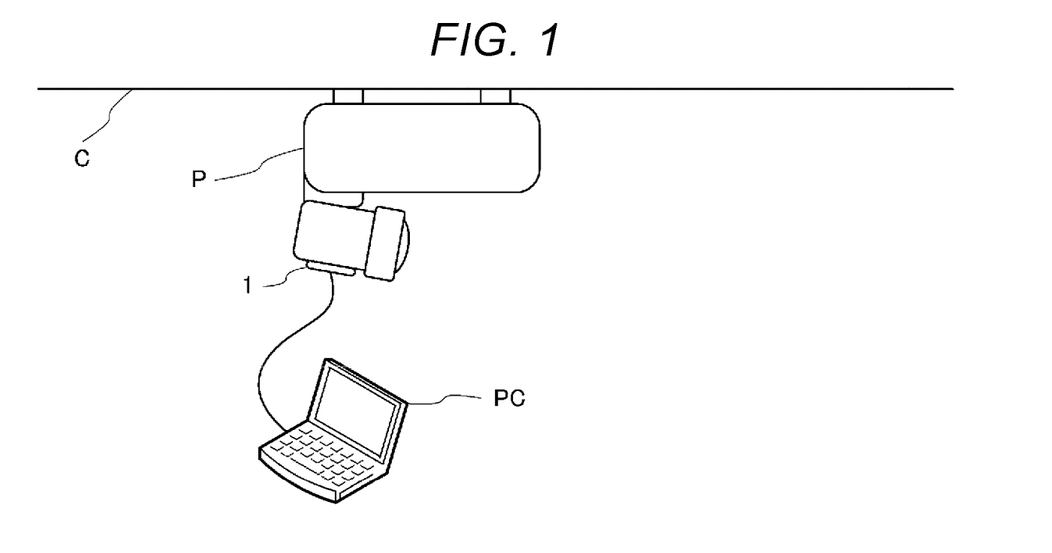
FIG. 1 is a diagram showing an example of use of a vibration-damping box including a physical quantity sensor.
Figure 2:
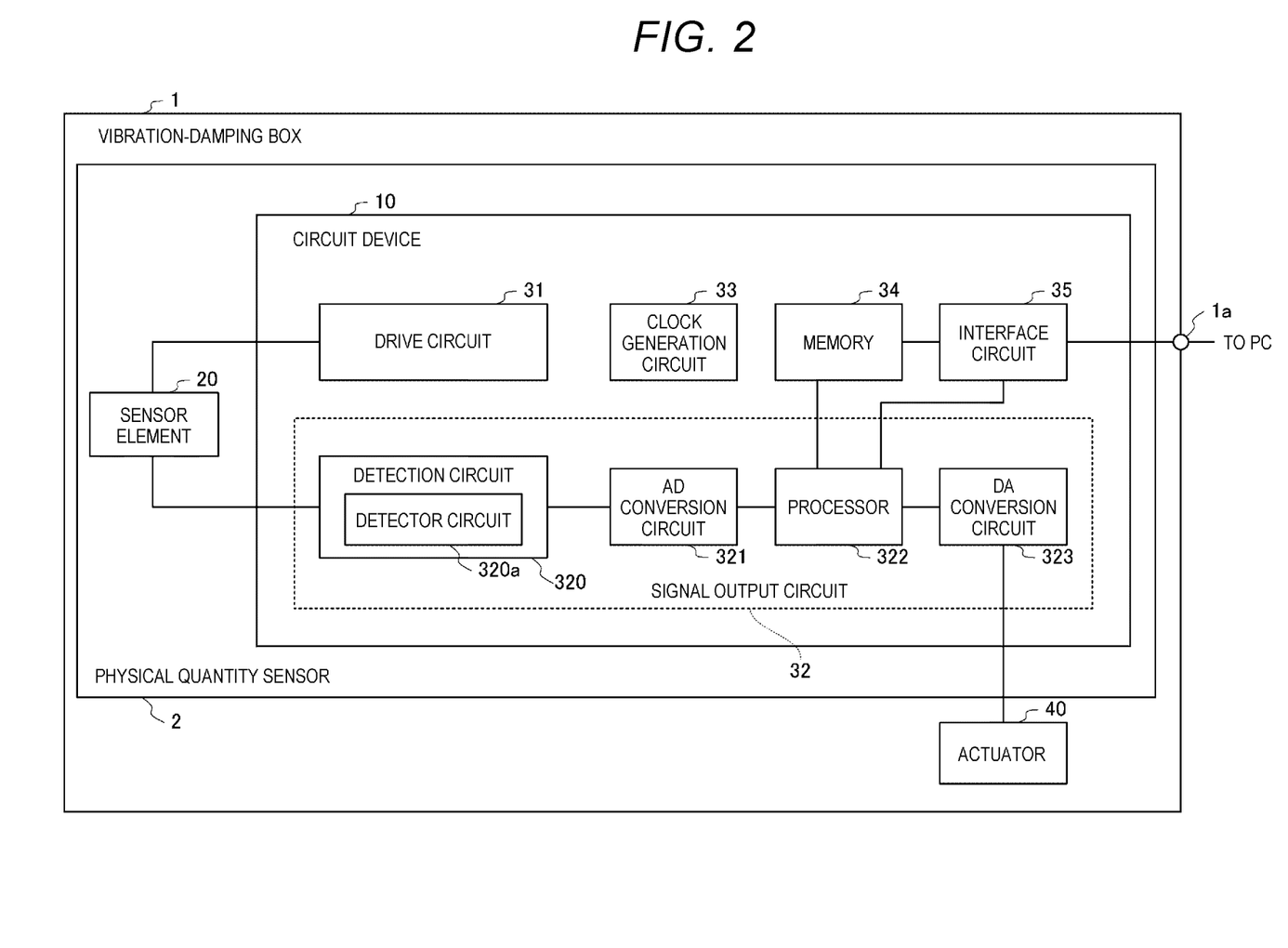
FIG. 2 is a block diagram of the vibration-damping box.

FIG. 1 is a diagram showing an example of use of a vibration-damping box 1 including a physical quantity sensor 2 according to an embodiment of the present disclosure. FIG. 2 is a block diagram of the vibration-damping box 1 according to the embodiment of the present disclosure. FIG. 1 shows a state in which a projector P is attached to a ceiling C. The projector P is a device that projects a predetermined image onto a screen (not shown). The projector P is an example of an electronic device.

The vibration-damping box 1 is attached to one surface of the projector P. The vibration-damping box 1 includes a housing, and includes the physical quantity sensor 2 and an actuator 40 in the housing. Therefore, in the embodiment, it can be said that the physical quantity sensor 2 and the actuator 40 are attached to the projector P.

The physical quantity sensor 2 operates in a resonance characteristic measurement mode and a vibration-damping mode. Of course, the physical quantity sensor 2 may be possible to operate in another mode. When the physical quantity sensor 2 operates in the vibration-damping mode, the physical quantity sensor 2 can damp a vibration of the projector P by detecting a vibration generated in the course of use of the projector P and driving the actuator to reduce the vibration (details will be described later).

The physical quantity sensor 2 can be coupled to a computer PC via a terminal to be described later. In the embodiment, the computer PC is used in the resonance characteristic measurement mode for measuring a resonance characteristic of the projector P. In the vibration-damping mode, the computer PC is not used. In the resonance characteristic measurement mode, the physical quantity sensor 2 excites the projector P by the actuator, and measures the resonance characteristic by acquiring the vibration generated in the projector P by the computer PC (details will be described later).

The computer PC may be a portable computer or a stationary computer as long as the computer PC is a computer capable of performing various calculation processes based on an output signal of the physical quantity sensor 2. A form of the terminal is not limited, and may be a tablet type, a smartphone, or the like. In the embodiment, the computer PC is an example of an external device coupled to the physical quantity sensor 2.

In the embodiment, the physical quantity sensor 2 includes a circuit device 10 and a sensor element 20. The physical quantity sensor 2 is coupled to the actuator 40. The physical quantity sensor 2 is coupled to the computer PC via a terminal 1a. In the embodiment, the actuator 40 is a voice coil motor (VCM), and the actuator 40 is not limited to the VCM.

In the embodiment, the sensor element 20 is a gyro sensor element. As the sensor element 20, various forms of gyro sensors can be employed. For example, an "out-of-plane detection type" sensor or the like that detects an angular velocity about a predetermined axis can be employed as the sensor element 20. The sensor element 20 outputs a detection signal indicating an angular velocity co acting on the sensor element 20.

The circuit device 10 has a function of generating a signal for driving the sensor element 20 and a function of driving the actuator 40 based on the detection signal from the sensor element 20. As shown in FIG. 2, the circuit device 10 includes a drive circuit 31, a signal output circuit 32, a clock generation circuit 33, a memory 34, and an interface circuit 35. The signal output circuit 32 includes a detection circuit 320 (an angular velocity detection circuit), an AD conversion circuit 321, a processor 322, and a DA conversion circuit 323.

Although not shown, the drive circuit 31 includes, for example, an oscillation circuit and an automatic gain control circuit. The drive circuit 31 adjusts a gain of a drive signal generated by the oscillation circuit by the automatic gain control circuit, and inputs the adjusted drive signal to a drive signal electrode of the sensor element 20, and therefore vibrates the sensor element 20.

The detection circuit 320 includes a detector circuit 320a that is a synchronous detector circuit. In addition to the detector circuit 320a, the detection circuit 320 further includes, for example, a current-voltage conversion amplifier, an AC amplifier, and a 90-degree phase shifter (not shown). Further, in the detection circuit 320, the detection signal output from the sensor element 20 is converted from a current signal to a voltage signal by the current-voltage conversion amplifier, and amplified by the AC amplifier. The amplified signal is input to the detector circuit 320a. A drive signal from the drive circuit 31 is input to the detector circuit 320a via the 90-degree phase shifter. Then, the detector circuit 320a performs synchronous detection using the drive signal as a reference signal to extract angular velocity information from the detection signal and output the extracted angular velocity information as a detector signal. In this way, the detection circuit 320 detects the angular velocity based on the detection signal from the sensor element 20.

The AD conversion circuit 321 converts the detector signal (the angular velocity information) output from the detector circuit 320a from an analog signal to a digital signal and outputs the digital signal.

The processor 322 is a circuit that performs a process of generating an actuator drive signal for driving the actuator 40 based on the detector signal extracted from the detection signal of the sensor element 20. In the embodiment, the processor 322 includes, for example, a processor such as a central processing unit (CPU) and a memory such as a read only memory (ROM) or a random access memory (RAM), and implements various functions by the processor executing a program stored in the memory as appropriate.

The DA conversion circuit 323 converts the actuator drive signal output from the processor 322 from a digital signal to an analog signal and outputs the analog signal.

The clock generation circuit 33 generates a clock signal for operation of each unit in the circuit device 10 based on a signal from an oscillator such as a crystal oscillator (not shown). Further, each unit in the circuit device 10 operates in synchronization with the clock signal.

The memory 34 is, for example, a rewritable memory, and stores control information of the actuator 40. Rewriting of the information stored in the memory 34 can be performed by the computer PC through the terminal 1a. Here, the control information includes various kinds of information to be used when the processor 322 drives and controls the actuator 40. The control information includes, for example, the resonance characteristic of the projector P. In addition, a control target value, a control condition, a control program, and the like may be included. The processor 322 can read and use the information stored in the memory 34 (a signal process based on the resonance characteristic and the like).

The interface circuit 35 is a circuit for performing data communication between the vibration-damping box 1 and the computer PC coupled thereto. The interface circuit 35 may be, for example, an interface circuit corresponding to an inter-integrated circuit (I2C) bus or an interface circuit corresponding to a serial peripheral interface (SPI) bus.

Inside the vibration-damping box 1, the sensor element 20 and the actuator 40 are disposed such that a direction of the angular velocity about the predetermined axis detected by the sensor element 20 coincides with a direction of the angular velocity about the predetermined axis induced in the projector P by driving the actuator 40. The direction of the angular velocity to be detected and the direction of the angular velocity to be induced may not completely coincide with each other, and may at least partially coincide with each other.

A vibration-damping direction may be a plurality of directions. In this case, angular velocities in a plurality of directions can be detected by the sensor element 20, and the actuator 40 that is driven in the plurality of directions to reduce an angular velocity component in each direction is used. In any case, when the actuator 40 is driven to attenuate the angular velocities detected by the sensor element 20, the vibration of the projector P can be damped.

A vibration generated by being transmitted from a periphery of the projector P to the projector P via the ceiling C or the like is generally a vibration in which vibrations of a plurality of frequency components are superimposed. Therefore, the detection signal of the sensor element 20 indicating the angular velocity corresponding to the vibration includes the angular velocities of the plurality of frequency components corresponding to the vibrations of the plurality of frequency components. Therefore, the angular velocity indicated by the detection signal output from the sensor element 20 is generally fairly complicated.

On the other hand, a frequency of a vibration to be reduced in the projector P is often a vibration having a specific frequency.

For example, an amplitude of the vibration at the specific frequency is greater than that at other frequencies, and may be visually recognized in an image projected on a screen by the projector P. The frequency of the vibration that can be visually recognized by human eyes is limited to a frequency band of a specific range. The specific frequency or a frequency to be attenuated in the specific frequency band coincides with a resonance frequency of the projector P. Therefore, by reducing the vibration of the resonance frequency, highly effective vibration damping can be achieved with relatively simple control. With such control, it is possible to actually reduce the vibration generated in the projector P by the operation of the actuator 40.

Therefore, in the embodiment, a configuration is used in which the resonance characteristic of the projector P is measured and the vibration of the measured resonance frequency is reduced. Specifically, when a predetermined instruction is given from the computer PC, the processor 322 receives the instruction via the interface circuit 35. The processor 322 operates in the resonance characteristic measurement mode in response to the instruction.

Resonance Characteristic Measurement Mode

In the resonance characteristic measurement mode, the processor 322 outputs an actuator drive signal for measuring the resonance characteristic of the projector P which is an electronic device. The actuator drive signal for measuring the resonance characteristic is a signal for vibrating the actuator 40 in a test manner.

In the embodiment, the actuator drive signals for measuring the resonance characteristic are first to n-th AC signals having first to n-th frequencies (n is an integer of 1 or more). The AC signal may be a signal whose amplitude varies. In the embodiment, the AC signal is a sine wave. That is, in the embodiment, the processor 322 outputs sine waves having a plurality of frequencies as the actuator drive signals.

Figure 3:
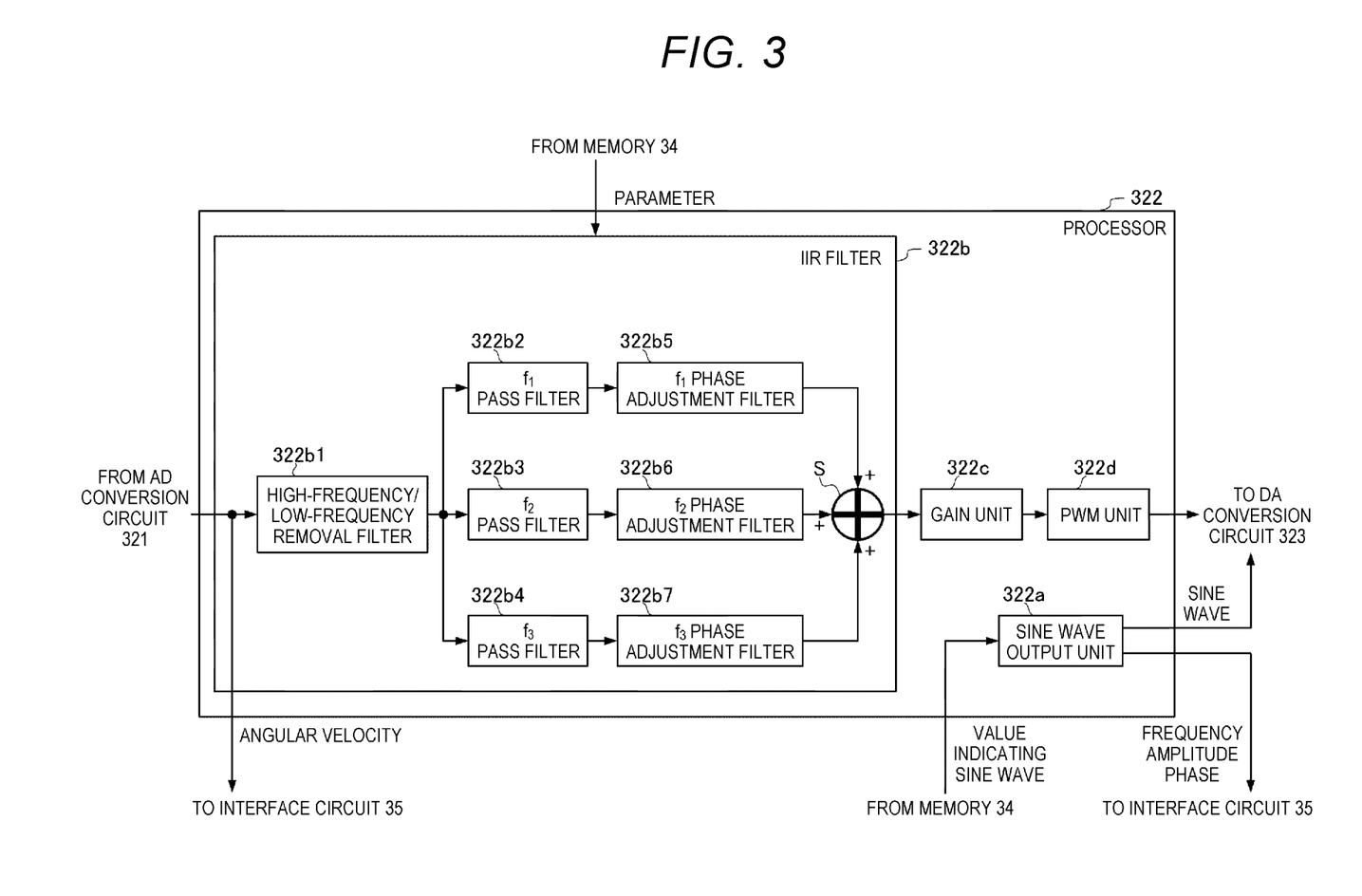
FIG. 3 is a block diagram showing a configuration of a processor.

FIG. 3 is a block diagram showing a configuration of the processor 322. The processor 322 includes a sine wave output unit 322a. The sine wave output unit 322a refers to a value stored in the memory 34, generates a sine wave having a specific frequency and has a predetermined amplitude, and outputs the sine wave to the DA conversion circuit 323. Various methods can be used as a configuration for outputting the sine wave. For example, a digital signal of the sine wave can be output by outputting a value identified by the following formula in time series.

$$S_0 = 0$$

$$S_{N+1} = S_N + \sin(N+1) - \sin(N)$$

Here, N is an integer indicating an order of signals output in time series, and is an integer value of 0 or more. The value calculated by $\sin(N+1) - \sin(N)$ is identified by one cycle and held in the memory 34. The processor 322 can output the digital signal indicating the sine wave based on the value stored in the memory 34. The frequency can be changed by changing an output interval of the signal.

The DA conversion circuit 323 converts the sine wave from the digital signal to an analog signal and outputs the analog signal to the actuator 40. As a result, the actuator 40 is driven as a response to the sine wave of the specific frequency, and excites the projector P with the sine wave of the specific frequency. At this time, the sine wave output unit 322a outputs, to the interface circuit 35, information indicating a frequency, an amplitude, and a phase of the sine wave. The interface circuit 35 outputs the information indicating the frequency, the amplitude, and the phase to the computer PC. As a result, the computer PC can identify the frequency, the amplitude, and the phase of the vibration excited by the actuator 40. The sine wave output unit 322a sequentially switches the frequency of the sine wave, and outputs the sine waves of first to n-th frequencies. As a result, the projector P is excited at the first to n-th frequencies.

The first to n-th frequencies may be determined in advance to include frequencies of vibration-damping targets. For example, a configuration may be used in which the frequency is changed at a predetermined frequency step within a predetermined range such as 0 Hz to 200 Hz or 0 Hz to 80 Hz.

When the projector P is excited by the actuator drive signal as described above, the resonance characteristic is identified by measuring the vibration actually generated in the projector P. The vibration may be measured in various forms. In the embodiment, the measurement is performed based on the detection signal of the sensor element 20. That is, when the actuator 40 is driven by the actuator drive signal and the projector P is excited, the sensor element 20 outputs the detection signal indicating the angular velocity corresponding to the vibration.

Therefore, the sensor element 20 outputs the first to n-th detection signals corresponding to the vibrations of the projector P generated by the sine waves of the first to n-th frequencies. When the detection signal is output, a digital signal indicating the angular velocity is input to the processor 322 through a signal process executed by the detection circuit 320 and the AD conversion circuit 321.

In the resonance characteristic measurement mode, the processor 322 outputs the digital signal to the interface circuit 35. The interface circuit 35 outputs the digital signal to the computer PC. As a result, in the computer PC, information indicating the vibration (the angular velocity) actually generated in the projector P can be obtained. The computer PC acquires, based on the information, the frequency, the amplitude, and the phase of the vibration actually generated in the projector P.

The computer PC includes a CPU, a RAM, a ROM, and the like (not shown), and can execute various programs. In the embodiment, the computer PC can execute a resonance characteristic measurement program. In a state in which the program is being executed, the computer PC acquires the frequency, the amplitude, and the phase of the sine wave to be used when the actuator 40 is driven as described above. The computer PC acquires the frequency, the amplitude, and the phase of the vibration actually generated in the projector P.

Figure 4:
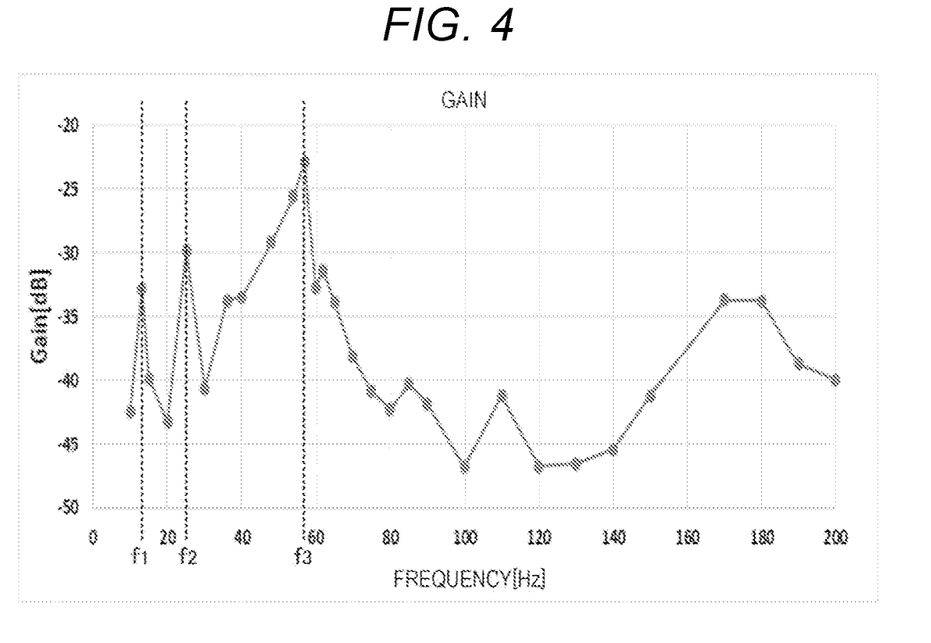
FIG. 4 is a diagram showing an example of a gain.

The computer PC acquires the resonance characteristic by comparing the amplitude and the phase for each frequency based on the acquired information. The computer PC uses the excited amplitude as a reference and performs a process of acquiring a ratio to the measured amplitude as a gain for each frequency. FIG. 4 shows an example of the gain obtained in this manner. A frequency at which the vibration of the projector P is recognized as shaking of an image projected on the screen is a relatively small frequency band, and is, for example, a band of 80 Hz or less or 60 Hz or less.

Therefore, the computer PC acquires, as the resonance frequency, a frequency at which the gain is equal to or greater than a threshold value (for example, −35 dB or more) in the frequency band. That is, in the computer PC, from results of excitation by the sine waves of the first to n-th frequencies, first to k-th resonance frequencies at which the gain is equal to or greater than the threshold value are identified (k is an integer of 1 or more and n or less). FIG. 4 shows an example in which a first frequency $f_1$ to a third frequency $f_3$ are acquired as the resonance frequencies (k=3). Of course, the number of values acquired as the resonance frequencies is not limited to three, and may be more or less. In the embodiment, the phase is not considered at the time of acquisition of the resonance frequencies. The resonance frequencies may be identified based on the phase.

Information indicating the resonance frequencies obtained as described above is stored in a storage medium (not shown) of the computer PC as the resonance characteristic. When the resonance characteristic is acquired, the computer PC outputs the resonance characteristic to the physical quantity sensor 2 via the interface circuit 35. When the interface circuit 35 acquires the resonance characteristic, information corresponding to the resonance characteristic is recorded in the memory 34.

Vibration-Damping Mode

When the information corresponding to the resonance characteristic measured in the resonance characteristic measurement mode is recorded in the memory 34, it is possible to perform control for reducing the vibration indicated by the resonance characteristic in the vibration-damping mode. That is, the vibration-damping mode is a mode in which an actuator drive signal for reducing the vibration of the projector P is output based on the resonance characteristic measured in the resonance characteristic measurement mode.

In the vibration-damping mode, the sensor element 20 detects the vibration generated in the projector P, which is transmitted from the periphery of the projector P via the ceiling C or the like. When the detection signal of the angular velocity indicating the vibration is output from the sensor element 20, the digital signal of the detector signal is output to the processor 322 through the detection circuit 320 and the AD conversion circuit 321.

The processor 322 generates the actuator drive signal for reducing a vibration whose center frequency is a resonance frequency indicated by the resonance characteristic, among vibrations indicated by the digital signal. FIG. 4 also shows a configuration for generating such an actuator drive signal. Specifically, the processor 322 includes an infinite impulse response (IIR) filter 322*b*, a gain unit 322*c*, and a PWM unit 322*d*.

The IIR filter is a filter that performs various processes on the digital signal. The IIR filter can be implemented by a known configuration, and can be implemented by, for example, a configuration shown in FIG. 5. In the example shown in FIG. 5, delay units 3221 and 3222 provide unit delays to an input signal and output the input signal. Signal adjustment units 3223 to 3227 multiply the input signal by coefficients and output the multiplied signals. The coefficients of the signal adjustment units 3223 to 3227 are a1 to b2 shown in the signal adjustment units 3223 to 3227 in FIG. 5. Addition units S1 to S4 give symbols shown in FIG. 5, add the symbols to the input signal shown in FIG. 5, and output signals after addition.

Figure 5:
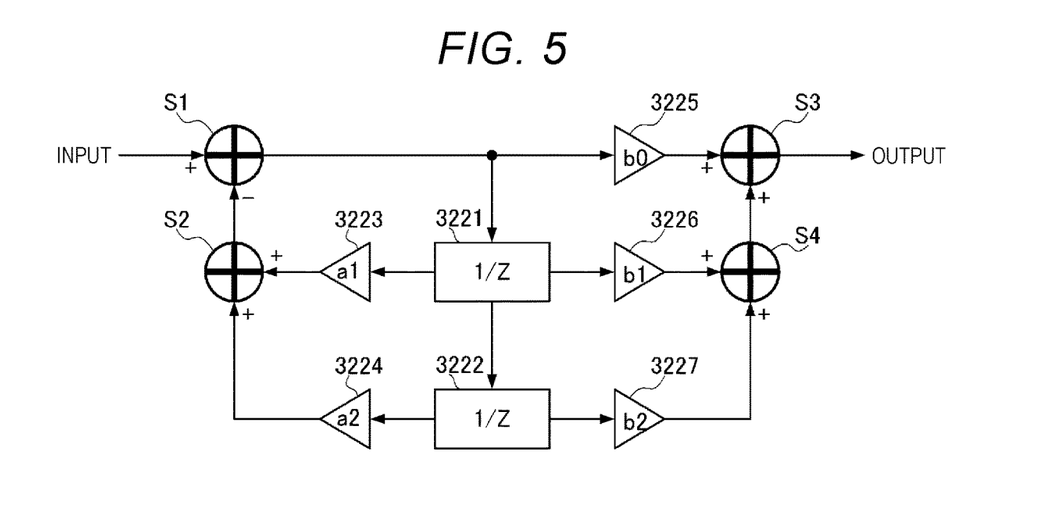
FIG. 5 is a diagram showing a configuration example of an IIR filter.

Therefore, in the example shown in FIG. 5, the addition unit S1 adds the signal input to the IIR filter and a signal obtained by turning a feedback signal into a negative signal, and outputs the signal after addition. The output signal is delayed by the delay units 3221 and 3222. The signal delayed by the delay unit 3221 is input to the signal adjustment units 3223 and 3226 and the delay unit 3222. The signal delayed by the delay unit 3222 is input to the signal adjustment units 3224 and 3227.

The signals input to the signal adjustment units 3223 and 3224 are multiplied by the coefficients a1 and a2, added by the addition unit S2, and then input to the addition unit S1. The signals input to the signal adjustment units 3226 and 3227 are multiplied by the coefficients b1 and b2, added by the addition unit S4, and then input to the addition unit S3. The addition unit S3 receives a signal obtained by multiplying an output of the addition unit S1 by a coefficient b0 given by the signal adjustment unit 3225. The addition unit S3 outputs a sum of both input signals.

By adjusting these coefficients, the IIR filter functions as a bandpass filter whose center frequency is any frequency within the frequency band to be reduced. By adjusting these coefficients, the IIR filter functions as a phase adjustment filter that adjusts the phase.

In the embodiment, seven filters as described above are formed in the IIR filter 322*b*. Specifically, the processor 322 functions as a high-frequency/low-frequency removal filter 322*b*1, an $f_1$ pass filter 322*b*2, an $f_2$ pass filter 322*b*3, an $f_3$ pass filter 322*b*4, an $f_1$ phase adjustment filter 322*b*5, an $f_2$ phase adjustment filter 322*b*6, and an $f_3$ phase adjustment filter 322*b*7.

In the above configuration, the processor 322 can adjust the coefficients of the signal adjustment units 3223 to 3227 of the filters. Specifically, the high-frequency/low-frequency removal filter 322*b*1 is a filter that excludes a low-frequency signal, which is a frequency equal to or lower than a predetermined first threshold value, and a high-frequency signal, which is a frequency equal to or higher than a second threshold value, as a frequency at which a human cannot visually recognize. Parameters indicating the coefficients for removing such signals are identified in advance and stored in the memory 34. The processor 322 controls the high-frequency/low-frequency removal filter 322*b*1 based on the parameters stored in the memory 34. As a result, the high-frequency/low-frequency removal filter 322*b*1 removes signals of frequencies within the predetermined frequency band and passes signals of remaining frequencies. The signals output from the high-frequency/low-frequency removal filter 322*b*1 are input to each of the $f_1$ pass filter 322*b*2, the $f_2$ pass filter 322*b*3, and the $f_3$ pass filter 322*b*4. Each of the $f_1$ pass filter 322*b*2, the $f_2$ pass filter 322*b*3, and the $f_3$ pass filter 322*b*4 is a bandpass filter that passes a signal in a band of a predetermined width with each of the first frequency $f_1$ to the third frequency $f_3$ as the center frequency. Here, the first frequency $f_1$ to the third frequency $f_3$ are resonance frequencies of the projector P identified based on the amplitudes of the first to n-th sine waves output to the actuator 40 and the detection signal output from the sensor element 20 according to the first to n-th sine waves.

The memory 34 stores parameters indicating the coefficients for passing the signals in the band of the predetermined width with the resonance characteristic as the center frequency. The processor 322 controls the $f_1$ pass filter 322*b*2, the $f_2$ pass filter 322*b*3, and the $f_3$ pass filter 322*b*4 based on the parameters stored in the memory 34. As a result, each of the $f_1$ pass filter 322*b*2, the $f_2$ pass filter 322*b*3, and the f 3 pass filter 322*b*4 outputs a filter transmission signal having a predetermined width with each of the first frequency $f_1$ to the third frequency $f_3$ as the center frequency.

The filter transmission signal output from each of the $f_1$ pass filter 322*b*2, the $f_2$ pass filter 322*b*3, and the $f_3$ pass filter 322*b*4 is input to each of the $f_1$ phase adjustment filter 322*b*5, the $f_2$ phase adjustment filter 322*b*6, and the $f_3$ phase adjustment filter 322*b*7. Each of the $f_1$ phase adjustment filter 322*b*5, the $f_2$ phase adjustment filter 322*b*6, and the $f_3$ phase adjustment filter 322*b*7 is a filter that performs the phase adjustment on the input filter signal to generate a phase-adjusted signal.

In the embodiment, the phase adjustment is phase inversion. The phase adjustment may be performed such that the vibration of the projector P is reduced by the vibration induced by the actuator 40. In this sense, phase shift that occurs after the phase adjustment may not be strictly 180°. The memory 34 stores parameters for inverting the phase in each of the filter transmission signals. Based on the parameters stored in the memory 34, the processor 322 controls the signal adjustment units 3223 to 3227 in each of the $f_1$ phase adjustment filter 322*b*5, the $f_2$ phase adjustment filter 322*b*6, and the $f_3$ phase adjustment filter 322*b*7 such that the phase in the filter transmission signal having each of the first frequency $f_1$ to the third frequency $f_3$ as the center frequency is inverted.

The phase-adjusted signals output from the $f_1$ phase adjustment filter 322b5, the $f_2$ phase adjustment filter 322b6, and the $f_3$ phase adjustment filter 322b7 are combined by the addition unit S and output from the IIR filter 322b. The signal output from the IIR filter 322b is input to the gain unit 322c. The gain unit 322c is a processing unit that performs proportional control, and outputs an output value proportional to an input value. Here, various types of control may be performed. For example, P control, PI control, PD control, or PID control may be performed.

The output signal of the gain unit 322c is input to the PWM unit 322d. The PWM unit 322d performs pulse width modulation on the input signal. That is, the PWM unit 322d outputs a digital signal as the actuator drive signal. The digital signal is converted into an analog signal by the DA conversion circuit 323, thereby becoming the actuator drive signal for driving the actuator 40.

According to the above configuration, the vibration of the resonance frequency corresponding to the resonance characteristic of the projector P can be extracted from the complicated detection signal detected by the sensor element 20, and can be used as the actuator drive signal. Then, according to the actuator drive signal, it is possible to reduce a main vibration component generated in the projector P, that is, the vibration of the resonance frequency. Therefore, the vibration of the projector P can be effectively reduced. Since the resonance characteristic is measured in the resonance characteristic measurement mode, the vibration of the projector P can be damped according to the resonance characteristic that can be changed according to an installation environment of the projector P or the like.

In the resonance characteristic measurement mode, the resonance characteristic can be measured by acquiring, by the computer PC, the detection signal output from the sensor element 20. When a measurement device separate from the sensor element 20 is attached in a manner of being in contact with the projector P in order to measure the resonance characteristic, the resonance characteristic may vary. In the embodiment, it is not necessary to attach the measurement device separate from the sensor element 20 in a manner of being in contact with the sensor element 20, and the computer PC is coupled only via a cable. Then, the resonance characteristic can be measured using the vibration-damping box 1 attached to the projector P at the time of actual vibration damping. Therefore, it is possible to accurately measure the resonance characteristic close to the resonance characteristic of the projector P during operation.

Further, in the resonance characteristic measurement mode, since the processor 322 excites the projector P with the sine waves, the processor 322 can easily excite the projector P at a plurality of frequencies.

Further, in the vibration-damping mode, the processor 322 generates the filter transmission signal by the bandpass filter having the resonance frequency indicated by the resonance characteristic as the center frequency, and generates the actuator drive signal based on the filter transmission signal. Therefore, as compared to the configuration in which the actuator drive signal is generated based on signals of all frequencies to be observed as the vibrations, the vibration of the projector P can be effectively damped by simple control.

Further, in the vibration-damping mode, the processor 322 generates the actuator drive signal for damping the vibration of the projector P based on the phase-adjusted signal obtained by adjusting the phase of the filter transmission signal. According to such a configuration, it is possible to generate the actuator drive signal for damping the vibration of the projector P with a simple configuration. According to the configuration in which a phase adjustment error signal is generated by a phase inversion process, the actuator drive signal for damping the vibration of the projector P can be generated by a simple process.

Further, in the embodiment, the vibration of the projector P can be damped based on the information (the parameters) corresponding to the resonance characteristic stored in the memory 34, and the resonance characteristic can be rewritten. Therefore, by rewriting the resonance characteristic according to the change in individual resonance characteristics of the projector P, it is possible to effectively damp the vibration of projector P having any resonance characteristic. By measuring the resonance characteristic in the resonance characteristic measurement mode, it is possible to identify the actual resonance characteristic of the projector P. Therefore, it is possible to perform the vibration damping according to the actual resonance characteristic of the projector P.

Further, in the embodiment, in the resonance characteristic measurement mode, the resonance characteristic can be acquired using the computer PC, which is an external device, and stored in the memory 34. Therefore, there is no need to provide a calculation unit or the like for acquiring the resonance characteristic in the vibration-damping box 1, and each circuit provided in the vibration-damping box 1 can be implemented in a simple configuration.

Further, in the embodiment, the filter transmission signal and the phase-adjusted signal are generated using the IIR filter. Therefore, each signal can be generated with a simple configuration. It is possible to easily change a filter characteristic according to the change in the resonance characteristic.

Other Embodiments

Figure 6:
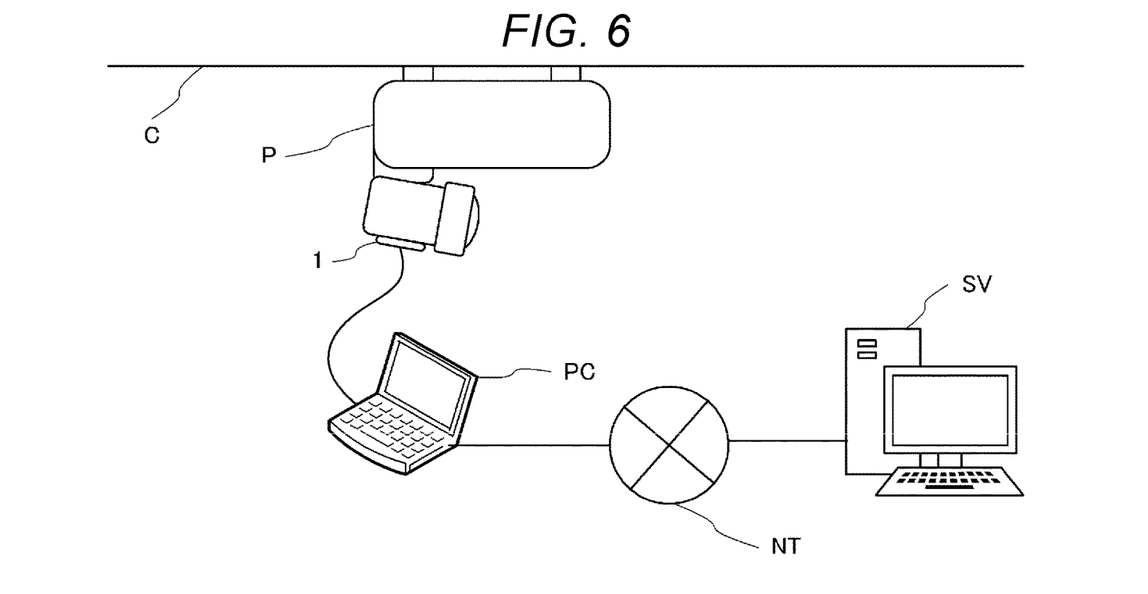
FIG. 6 is a diagram showing an example of use of the vibration-damping box including the physical quantity sensor.

The above-described embodiment is an embodiment according to the present disclosure. Therefore, the configuration of each unit can be replaced with any configuration having the same function. For example, the computer PC may further transmit information acquired from the physical quantity sensor 2 to an external server and acquire the resonance characteristic in a server. FIG. 6 is a diagram showing an example of such a configuration. The vibration-damping box 1 may have a configuration same as that of the above-described embodiment. The computer PC is coupled to a network NT and can communicate with a server SV coupled to the network NT.

Then, the computer PC acquires, from the physical quantity sensor 2, a frequency, an amplitude, and a phase of a sine wave as an actuator drive signal for exciting the projector P. The computer PC acquires, from the physical quantity sensor 2, the frequency, the amplitude, and the phase of the vibration of the projector P detected by the sensor element 20. The computer PC transmits these pieces of information to the server SV. The server SV acquires these pieces of information, and acquires a resonance frequency based on a gain that is a ratio of an amplitude for each frequency.

The server SV transmits the resonance frequency to the computer PC, and the computer PC acquires these pieces of information and stores the information in the memory 34 provided in the physical quantity sensor 2. According to the above configuration, it is possible to intensively analyze the information acquired from the vibration-damping boxes 1 used in a plurality of places by the server SV. Therefore, it is possible to implement an aspect of providing a service of collecting information from a plurality of vibration-damping boxes 1 and acquiring the resonance characteristic of the projector P to which each vibration-damping box 1 is attached.

Further, in the above-described embodiment, the amplitude of the sine wave output by the processor 322 is fixed to a predetermined amplitude, and may be variable. For example, the amplitude may be variable according to an instruction of a user or the like, or may be variable according to a weight, a size, and the like of an electronic device such as the projector P. Further, the resonance characteristic may be identified including the phase.

Further, a coupling mode between the electronic device such as the projector P and the computer PC may be wired coupling or wireless coupling. In the latter case, the change in the resonance characteristic due to the coupling can be made fairly small. Further, the configuration of the IIR filter 322*b* is not limited to the configuration shown in FIG. 5, and for example, the order may be another value.

Further, an attachment destination of the electronic device is not limited to the ceiling, and may be attached to a post, a wall, a table, or the like. Further, the electronic device is not limited to the projector P, and the vibration-damping box 1 may be attached to various electronic devices. For example, a security camera, a monitoring camera, or the like attached to a ceiling, a post, a wall, or the like may be a target of vibration damping, or a digital still camera, a digital video camera, or the like may be a target of vibration damping. Not only an electronic device that performs imaging, but also other electronic devices, for example, any device such as a robot, may be the target of vibration damping.

Further, the physical quantity sensor may be attached to the electronic device in various modes other than the mode in which the physical quantity sensor is attached to the electronic device by the vibration-damping box. For example, the actuator and the physical quantity sensor may be provided in a housing of the electronic device.

The physical quantity sensor is a sensor attached to an electronic device including an actuator, and a detection signal of the physical quantity sensor may be used for vibration damping. Therefore, the physical quantity sensor is not limited to the gyro sensor as in the above-described embodiment, and may be an acceleration sensor, a speed sensor, an inertial sensor, or the like. The physical quantity sensor is a sensor attached to the electronic device, and an attachment method is not limited. For example, the physical quantity sensor may be attached by an adhesive material, may be attached by a fastening unit or the like, or may be attached by a portion to be engaged. The physical quantity sensor may be attachable to and detachable from the electronic device, or may be difficult to be detached after being attached once.

The actuator may be a device that has a drive portion and physically operates, for example, to vibrate the electronic device by applying a physical quantity such as acceleration to the electronic device. Therefore, various devices other than the above-described VCM can be used as the actuator. For example, various motors such as a stepping motor, a DC motor, and an AC motor, and a mechanism in which an object is operated by an electromagnet, such as a solenoid actuator, may be used, and various devices can be used as the actuator.

The actuator may be provided in the electronic device at least when the physical quantity sensor is operated. Therefore, as in the above-described embodiment, the vibration-damping box 1 may be attached to the projector P, which is the electronic device, so that the electronic device may include the actuator, or the actuator may be attached to the electronic device by a method different from that of the physical quantity sensor. For example, the actuator may be attached to the electronic device separately from the physical quantity sensor, so that the electronic device may include the actuator. In a manufacturing stage of the electronic device, the electronic device may incorporate the actuator.

The physical quantity sensor may be provided in the electronic device at least when the physical quantity sensor is operated. Therefore, a timing of attaching the physical quantity sensor to the electronic device may be any timing. In the manufacturing stage of the electronic device, the physical quantity sensor may be attached to the electronic device, or the physical quantity sensor may be attached to the electronic device at a timing different from that of the actuator.

The sensor element only needs to be able to output a detection signal corresponding to the physical quantity. The detection signal may indicate the physical quantity itself, or may be implemented such that the physical quantity is identified by performing a predetermined process on the detection signal. In any case, the detection signal indicates the physical quantity acting on the electronic device, and thus indicates the vibration of the electronic device.

The circuit device only needs to be able to output the actuator drive signal for driving the actuator based on the detection signal. That is, the circuit device only needs to be able to drive the actuator based on the detection signal. The actuator drive signal may be a signal transferred to the actuator as in the above-described embodiment, or may be a signal transferred to the circuit when the actuator includes a circuit for driving the actuator.

The circuit device may have at least the resonance characteristic measurement mode and the vibration-damping mode, and may have other modes. The resonance characteristic measurement mode only needs to be able to output the actuator drive signal for measuring the resonance characteristic of the electronic device by vibrating the electronic device. That is, in the resonance characteristic measurement mode, the actuator drive signal for exciting the electronic device is output. If the size, the material, the installation environment, and the like of the electronic device are different, the resonance characteristics of the electronic device are different, but if the electronic device can be excited, the resonance characteristic can be measured by measuring a response to the excitation.

The resonance characteristic is a characteristic of a frequency at which the electronic device resonates, and only needs to indicate at least a frequency band in which a vibration having an amplitude exceeding a predetermined reference can be generated. If the frequency band to be damped is limited, for example, a frequency at which a vibration having an amplitude exceeding a predetermined reference can be generated may be indicated within the predetermined frequency band to be damped. For example, the predetermined reference may be various references, and may be, for example, a threshold value for an amplitude, a threshold value for an amplitude gain for excitation, or a reference for extracting a relatively large amplitude as compared to other frequencies.

The vibration-damping mode only needs to be able to output an actuator drive signal for reducing the vibration of the electronic device based on the resonance characteristic measured in the resonance characteristic measurement mode. That is, in the vibration-damping mode, the actuator drive signal for damping the vibration of the electronic device at least at the resonance frequency is output. If the resonance characteristic is already measured, the vibration to be damped is clarified based on the resonance characteristic, and the vibration of the electronic device can be effectively damped.

The memory only needs to be able to store the resonance characteristic of the electronic device. That is, by changing a content of the resonance characteristic stored in the memory, a content of the actuator drive signal for driving the actuator to damp the vibration may be changed. A format of the information indicating the resonance characteristic may be in various forms.

The signal output circuit only needs to be able to output an actuator drive signal for driving the actuator such that the vibration corresponding to the resonance characteristic included in the vibrations of the electronic device indicated by the detection signal is reduced. That is, the signal output circuit drives the actuator based on the detection signal and the resonance characteristic stored in the memory. At this time, as compared with the case where the actuator is not driven, the actuator is driven such that the vibration corresponding to the resonance characteristic is reduced. Therefore, the actuator may reduce the vibration of the frequency indicated by the resonance characteristic, or may reduce the vibration of the frequency indicated by the resonance characteristic and the vibration of another frequency.

The resonance characteristic is a characteristic of a frequency at which the electronic device resonates, and only needs to indicate at least a frequency band in which a vibration having an amplitude exceeding a predetermined reference can be generated. If the frequency band to be damped is limited, for example, a frequency at which a vibration having an amplitude exceeding a predetermined reference can be generated may be indicated within the predetermined frequency band to be damped. For example, the predetermined reference may be various references, and may be, for example, a threshold value for an amplitude, a threshold value for an amplitude gain for excitation, or a reference for extracting a relatively large amplitude as compared to other frequencies.

The actuator drive signal may be a signal transferred to the actuator as in the above-described embodiment, or may be a signal transferred to the circuit when the actuator includes a circuit for driving the actuator.

The interface circuit may be able to rewrite the resonance characteristic stored in the memory according to an external signal. That is, the resonance characteristic stored in the memory can be rewritten at any timing. As a result, the resonance characteristic to be damped may be changed at any timing after the electronic device is installed. A standard for rewriting the information stored in the memory may be various standards.

What is claimed is:

1. A physical quantity sensor that is attached to an electronic device and that is provided with an actuator, the physical quantity sensor comprising:
    a sensor element configured to output a detection signal corresponding to an angular velocity around a predetermined axis; and
    a circuit device configured to output an actuator drive signal for driving the actuator based on the detection signal, wherein
    the circuit device is configured to perform:
        a resonance characteristic measurement mode of outputting the actuator drive signal for measuring a resonance characteristic of the electronic device by vibrating the electronic device, wherein the resonance characteristic includes a plurality of resonance frequencies of the electronic device;
        a filter mode of filtering a digital signal of the detection signal in parallel via a plurality of frequency filters that pass frequencies corresponding to the plurality of resonance frequencies so as to generate a vibration-damping actuator drive signal for the actuator; and
        a vibration-damping mode of outputting the vibration-damping actuator drive signal to the actuator for reducing a vibration of the electronic device.

2. The physical quantity sensor according to claim 1, wherein
    in the resonance characteristic measurement mode,
    the circuit device is configured to output first to n-th AC signals having first to n-th frequencies of the plurality of resonance frequencies, n being an integer of 1 or more, as the actuator drive signal for measuring the resonance characteristic, and
    the sensor element is configured to output first to n-th detection signals corresponding to vibrations of the electronic device generated by the first to n-th AC signals.

3. The physical quantity sensor according to claim 1, wherein
    the circuit device includes a processor, and
    in the resonance characteristic measurement mode,
    the processor is configured to output a sine wave as the actuator drive signal for measuring the resonance characteristic.

4. The physical quantity sensor according to claim 2, wherein
    in the vibration-damping mode,
    the circuit device is configured to
        generate first to k-th filter transmission signals by performing first to k-th bandpass filter processes corresponding to first to k-th resonance frequencies via the plurality of frequency filters, k being an integer of 1 or more and n or less, of the electronic device identified based on amplitudes of the first to n-th AC signals and amplitudes of the first to n-th detection signals, and
        generate the vibration-damping actuator drive signal for reducing the vibration of the electronic device based on the first to k-th filter transmission signals.

5. The physical quantity sensor according to claim 4, wherein
    in the vibration-damping mode,
    the circuit device is configured to
        generate first to k-th phase-adjusted signals by performing first to k-th phase adjustment processes on the first to k-th filter transmission signals, and
        generate the vibration-damping actuator drive signal for reducing the vibration of the electronic device by combining the first to k-th phase-adjusted signals.

6. The physical quantity sensor according to claim 5, wherein
    the first to k-th phase adjustment processes are phase inversion processes for the first to k-th filter transmission signals.

7. An electronic device comprising:
    an actuator; and
    a physical quantity sensor including:
        a sensor element configured to output a detection signal corresponding to an angular velocity around a predetermined axis; and a circuit device configured to output an actuator drive signal for driving the actuator based on the detection signal, wherein
the circuit device is configured to perform:
- a resonance characteristic measurement mode of outputting the actuator drive signal for measuring a resonance characteristic of the electronic device by vibrating the electronic device, wherein the resonance characteristic includes a plurality of resonance frequencies of the electronic device;
- a filter mode of filtering a digital signal of the detection signal in parallel via a plurality of frequency filters that pass frequencies corresponding to the plurality of resonance frequencies so as to generate a vibration-damping actuator drive signal for the actuator; and
- a vibration-damping mode of outputting the vibration-damping actuator drive signal to the actuator for reducing a vibration of the electronic device.

* * * * *